US012335022B2

(12) United States Patent
Lin (10) Patent No.: US 12,335,022 B2
(45) Date of Patent: Jun. 17, 2025

(54) UPLINK TRANSMISSION SCHEDULING IN NON-TERRESTRIAL NETWORK

(71) Applicant: GUANGDONG OPPO MOBILE TELECOMMUNICATIONS CORP., LTD., Dongguan (CN)

(72) Inventor: Hao Lin, Neuilly sur Seine (FR)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 406 days.

(21) Appl. No.: 17/936,776

(22) Filed: Sep. 29, 2022

(65) Prior Publication Data

US 2023/0038582 A1    Feb. 9, 2023

Related U.S. Application Data

(63) Continuation of application No. PCT/IB2020/000486, filed on Apr. 3, 2020.

(51) Int. Cl.
*H04B 7/185* (2006.01)
*H04L 5/00* (2006.01)
*H04W 72/1268* (2023.01)
*H04W 72/23* (2023.01)

(52) U.S. Cl.
CPC ....... *H04B 7/18513* (2013.01); *H04L 5/0048* (2013.01); *H04W 72/1268* (2013.01); *H04W 72/23* (2023.01)

(58) Field of Classification Search
CPC .............. H04B 7/18513; H04W 72/23; H04W 72/1268; H04L 5/0048
See application file for complete search history.

(56) References Cited

U.S. PATENT DOCUMENTS

| 2019/0254073 | A1* | 8/2019 | Sheng | H04W 76/11 |
| 2019/0313357 | A1* | 10/2019 | Wang | H04W 56/0045 |
| 2019/0342845 | A1* | 11/2019 | Laselva | H04W 72/0446 |
| 2020/0153500 | A1* | 5/2020 | Kim | H04B 17/318 |
| 2021/0105731 | A1* | 4/2021 | Lin | H04W 72/23 |
| 2021/0105761 | A1* | 4/2021 | Cheng | H04L 5/0053 |
| 2021/0235491 | A1* | 7/2021 | Iyer | H04W 74/002 |
| 2021/0281520 | A1* | 9/2021 | Shrestha | H04W 56/0045 |
| 2021/0314889 | A1* | 10/2021 | Rico Alvarino | H04W 56/0045 |

(Continued)

OTHER PUBLICATIONS

Intel Corporation, "Discussion on TA and RACH procedure for NTN", 3GPP TSG RAN WG1 #97 R1-1906804, Reno, Nevada, US May 13-17, 2019 (3 pages).

(Continued)

*Primary Examiner* — Jael M Ulysse
(74) *Attorney, Agent, or Firm* — PERKINS COIE LLP (57) ABSTRACT

A method for performing an uplink transmission by a user equipment in a non-terrestrial network, a method for scheduling uplink transmission in a non-terrestrial network, a user equipment and a base station are provided. The method comprises: receiving, from a base station, a first information for indicating uplink transmission resources, and a second information, wherein the second information comprises a first parameter for indicating the uplink transmission resources; performing, based on the first information and the second information, an uplink transmission on the uplink transmission resources.

18 Claims, 9 Drawing Sheets

(56) References Cited

U.S. PATENT DOCUMENTS

| | | | |
|---|---|---|---|
| 2021/0345280 A1* | 11/2021 | Zhang | H04W 56/0005 |
| 2021/0351888 A1* | 11/2021 | Park | H04B 7/0695 |
| 2022/0158770 A1* | 5/2022 | Hong | H04L 5/0091 |
| 2022/0329314 A1* | 10/2022 | Liu | H04W 52/42 |
| 2023/0070564 A1* | 3/2023 | Chung | H04B 7/0695 |

OTHER PUBLICATIONS

Interdigital Inc, "On Initial Access and RACH Procedures for NTN", 3GPP TSG RAN WG1 Meeting #96bis R1-1904858, XI'an, China, Apr. 8-12, 2019 (5 pages).

CATT, "Physical layer control procedure enhancement", 3GPP TSG RAN WG1 Meeting #98bis R1-1910337, Chongqing, China, Oct. 14-20, 2019 (5 pages).

Ericsson, "TP for Section 6.2 in TR 38.821 on NTN PHY control procedures", 3GPP TSG-RAN WG1 Meeting #99 R1-1912722, Reno, USA, Nov. 18-22, 2019 (5 pages).

OPPO, "NTN control procedure for physical layer", 3GPP TSG RAN WG1 #98bis R1-1910386, Chongqing, China, Oct. 14-20, 2019 (3 pages).

International Search Report in the international application No. PCT/IB2020/000486, mailed on Nov. 24, 2020 (5 pages).

Written Opinion of the International Search Authority in the international application No. PCT/IB2020/000486, mailed on Nov. 24, 2020 (11 pages).

* cited by examiner

UPLINK TRANSMISSION SCHEDULING IN NON-TERRESTRIAL NETWORK

CROSS-REFERENCE TO RELATED APPLICATIONS

This is a continuation of International Patent Application No. PCT/IB/2020/000486, filed on Apr. 3, 2020, the disclosure of the above reference applications are hereby incorporated by reference in their entireties.

BACKGROUND

Non-terrestrial networks (NTN) refer to networks, or segments of networks, using an airborne or spaceborne vehicle for transmission:
  Spaceborne vehicles: Satellites (including Low Earth Orbiting (LEO) satellites, Medium Earth Orbiting (MEO) satellites, Geostationary Earth Orbiting (GEO) satellites as well as Highly Elliptical Orbiting (HEO) satellites)
  Airborne vehicles: High Altitude Platforms (HAPs) encompassing Unmanned Aircraft Systems (UAS) including Lighter than Air UAS (LTA), Heavier than Air UAS (HTA), all operating in altitudes typically between 8 and 50 km, quasi-stationary.

The communication via satellite is an interesting means thanks to its well-known coverage, which may bring the coverage to the locations that normally cellular operators are not willing to deploy either due to non-stable crowd potential client, e.g. extreme rural, or due to the high deployment cost, e.g. middle of ocean, mountain peak.

Nowadays, the satellite communications is a separate technology to 3GPP cellular technology. Coming to 5G era, these two technologies may be merged together, i.e. a 5G terminal may access to the cellular network and satellite network. NTN technology may be used for this purpose. It is to be designed based on the specification 3GPP NR (New Radio) as radio access technology (RAT) defined by 3GPP with necessary enhancement.

In NTN, due to very high satellite altitude, the round trip time (RTT) between the sender (satellite or base station/UE) and the receiver (UE/satellite or base station) is extremely long, the distance between the sender and the receiver being for example higher than 30 km. In Release 15 NR, the RTT is usually compensated by the timing advance (TA) applied by the sender to compute a start time for starting the transmission of data.

However, in NTN, the long RTT will result in a very long TA, such that the downlink receptions will be effected due to this long TA. For example, a sender may not be able to apply the specified TA because the start time for starting the transmission computed based on this TA is already in the past.

There appears thus a need to improve the situation with this respect.

SUMMARY

The present disclosure is for example applicable to a Non-terrestrial networks (NTN). The present disclosure relates to a method for performing an uplink transmission in a non-terrestrial network, a method for scheduling uplink transmission in a non-terrestrial network, a user equipment and a base station.

The scope of protection sought for various embodiments of the invention is set out by the independent claims. The various embodiments/examples, aspects and features, if any, described in this specification that do not fall under the scope of the independent claims are to be interpreted as examples useful for understanding various embodiments of the invention.

According to a first aspect, there is provided a method for performing an uplink transmission by a user equipment in a non-terrestrial network. The method comprises: receiving, from a base station, a first information for indicating uplink transmission resources, and a second information, where the second information comprises a first parameter for indicating the uplink transmission resources; and performing, based on the first information and the second information, an uplink transmission on the uplink transmission resources.

According to a second aspect, there is provided a method for scheduling uplink transmission in a non-terrestrial network. The method comprises: sending, by a base station to one or more user equipments, a first information for indicating uplink transmission resources, and sending, by the base station to one or more user equipments, a second information, where the second information comprises a first parameter for indicating the uplink transmission resources.

According to a third aspect, there is provided a user equipment, comprising: a processor; a transceiver; and a memory configured to store instructions. The processor is configured to execute the instructions to: control the transceiver to receive, from a base station, a first information for indicating uplink transmission resources, and a second information, where the second information comprises a first parameter for indicating the uplink transmission resources; and perform, based on the first information and the second information, an uplink transmission on the uplink transmission resources.

According to a fourth aspect, there is provided a base station, comprising: a processor; a transceiver; and a memory configured to store instructions. The processor is configured to execute the instructions to: control the transceiver to send, to one or more user equipments, a first information for indicating uplink transmission resources, and send, to one or more user equipments, a second information, where the second information comprises a first parameter for indicating the uplink transmission resources.

BRIEF DESCRIPTION OF THE FIGURES

Some embodiments are now described, by way of example only, and with reference to the accompanying drawings, in which.

DETAILED DESCRIPTION

Example embodiments will be described below with reference to functions, engines, block diagrams, flow diagrams, state transition diagrams and/or flowcharts illustrating methods, apparatuses, systems, computer programs, computer readable mediums according to one or more exemplary embodiments.

Figure 1:
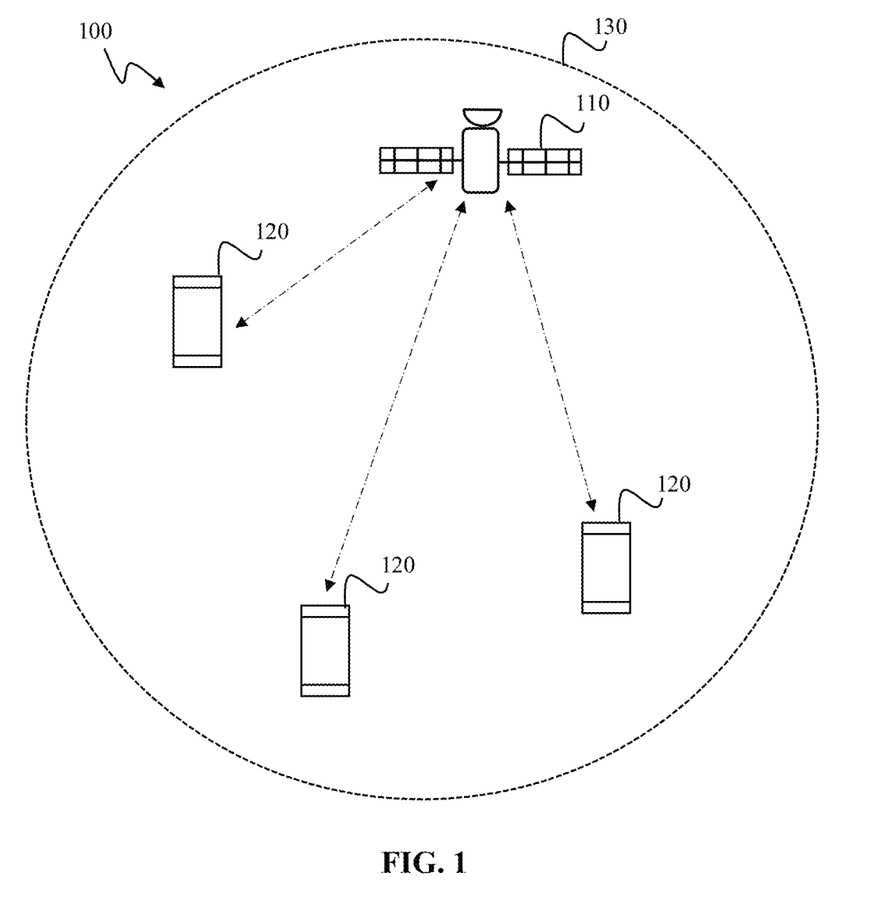
FIG. 1 represents schematically a communication system in which one or more disclosed embodiments may be implemented.

FIG. 1 depicts an example non-terrestrial network 100, in accordance with some example embodiments. The non-terrestrial network 100 includes a base station 110 in a satellite and one or more user equipments 120 with the radio cell coverage of the base station.

Non-terrestrial networks (NTN) refer to networks, or segments of networks, using an airborne or spaceborne vehicle for transmission:

Spaceborne vehicles: Satellites (including Low Earth Orbiting (LEO) satellites, Medium Earth Orbiting (MEO) satellites, Geostationary Earth Orbiting (GEO) satellites as well as Highly Elliptical Orbiting (HEO) satellites)

Airborne vehicles: High Altitude Platforms (HAPs) encompassing Unmanned Aircraft Systems (UAS) including Lighter than Air UAS (LTA), Heavier than Air UAS (HTA), all operating in altitudes typically between 8 and 50 km, quasi-stationary.

Due to long RTT delay, all the uplink transmissions will apply a very long time advance (TA) value this will impact the downlink reception. A time domain location offset is applied to shift the time of an uplink transmission. Thus, the user equipment, UE, will apply a time domain location offset value (designated here as K_offset) to the initial time domain location scheduled or configured for an uplink transmission. The time domain location offset is indicated by the base station or the time offset can be calculated based on other parameter, e.g. timing advance, indicated by the base station.

The time domain location offset may be signaled in system information, where the same time domain location offset is applied for the UEs in the same cell (at cell level). Optionally, the time domain location offset may be signaled in a parameter corresponding to one or more beams (beam level), where the UEs within the same beam size/beam range will apply the same offset value. Optionally, the time domain location offset may be signaled in RAR and/or MAC-CE and/or RRC configuration and/or DCI, where specific UE or a group of UEs will apply the signaled offset (UE level). As a consequence one or more time domain location offset values may correspond to the time domain location offset configuration(s) sent by the base station for one uplink transmission. Using time domain location offset indication at different levels allows to reduce the overhead required for signaling the offset value(s). For example, the time domain location offset signaling at cell level may be fixed and sent once during a given period of time, while the time domain location offset signaling at beam or UE level may be varying during that period of time, for example depending on beam configuration and/or UE localisation.

In the following, we will describe several examples that illustrate how the base station may indicate this time offset to a user equipment and how the user equipment may apply the time offset value(s).

Example 1: System Information Includes Time Domain Location Offset (or Cell Level Configuration)

The configuration is performed here for all UEs within a radio cell with a common offset value. The base station, designated by gNB as in 5G 3GPP standard, may use cell level signaling or any cell level configuration signal, e.g. using a system information, like a SIB (System Information Block) (e.g. SIB1, SIB2, SIB3, etc) to indicate the time domain location offset (K_offset) value. This offset value have then to be applied to all UEs within the concerned cell for determining the uplink transmission resources.

Example 2: Footprint Level Configuration

In NTN system, the satellite may send one or more beams to the earth, and each beam may correspond to a footprint zone on the earth surface. The satellite may be seen as a cell, which is equivalent to the case that for a given cell, it has one or more beam zones (or one or more footprints). The round trip time (RTT) between the satellite and a UE in one beam zone may be different from the RTT between the same satellite and another UE in another beam zone. In this case, the K_offset can be configured per beam zone or per footprint. As there is not a configuration dedicated to beam zone or footprint in Rel. 15 or Rel. 16, one solution is to introduce such configuration. The configuration is under the cell-level configuration, which corresponds to ServingCell-Config, e.g. under the serving cell configuration, it at least contains the configuration for the footprints, by adding or releasing one or more footprints with footprint IDs. For each added footprint ID, there is footprint configuration.

```
ServingCellConfig ::= SEQUENCE {
footprint-ToReleaseList SEQUENCE (SIZE (1..maxNroffootprint))
OF Footprint-Id OPTIONAL, -- Need N
footprint-ToAddModList SEQUENCE (SIZE (1..maxNroffootprint))
OF Footprint-Config OPTIONAL, --
Need N
}
```

In each footprint configuration, it contains at least a footprint ID and the configurations for uplink configuration and K_offset value for this footprint ID, e.g.,

```
Footprint-Config ::= SEQUENCE {
Footprint-ID
K_offset
UplinkConfig
}
```

The advantage of having the footprint configuration under ServingCellConfig is that even downlink configuration can be put under the Footprint-Config, so that each footprint configuration can have dedicated configuration for its downlink and uplink.

Optimally, the K_offset configuration can be under UplinkConfig. Since the uplink configuration is already dedicated to a given footprint, its underlying UplinkConfig can at least contain the K_offset configuration, e.g.

```
UplinkConfig::= SEQUENCE {
K_offset
}
```

Alternatively, a solution without introducing the footprint configuration is to implicitly link the bandwidth part (BWP) with the footprint. In fact, the beams from the satellite can rely on different frequencies, i.e. different beams (or footprints) are at different frequencies with dedicated frequency resources. Thus, the BWP can be made use of for representing footprint. An example is to configure K_offset under uplink BWP configuration. For a NTN cell, it can configure one or more BWPs, and the one or more BWPs can represent one or more footprints, and the corresponding K_offset values can be configured under BWP configuration.

```
BWP-Uplink::= SEQUENCE {
bwp-Id
bwp-Common
bwp-Dedicated
K_offset
}
```

When the K_offset is configured in BWP-Uplink, the K_offset follows the active uplink BWP. The UE can be configured with one or more uplink BWPs, and only one uplink BWP is active. When the UE changes the active uplink BWP either by RRC reconfiguration or DCI triggered BWP switching or due to performing RACH process, the K_offset will be changed accordingly with the K_offset value associated with the target uplink active BWP. One example is that if the UE is configured with uplink BWP1 and uplink BWP2. In uplink BWP1, it is configured with K_offset 1 and in uplink BWP2, it is configured with K_offset 2. When the UE changes the active BWP from uplink BWP1 to uplink BWP2, the UE will update the K_offset from K_offset 1 to K_offset 2. In some examples, the K_offset is not configured in different BWP-Uplink, but instead dedicated timing advance (TA) value is configured for different uplink BWP, e.g. TA1 for BWP1 and TA2 for BWP2. In this case, when the UE switches the active uplink BWP from BWP1 to BWP2, the UE needs to adapt the K_offset based on the TA values of the source BWP (BWP1) and the target BWP (BWP2). One example of adaptation is that the K_offset is smallest integer that is greater than or equal to (TA divided by G), where G is the granularity which refers to the slot interval if the K_offset is of slot unit, i.e. a mount of slots; or refers to the symbol interval if the K_offset is of symbol unit, i.e. a mount of symbols. Moreover, the G is calculated based on subcarrier spacing of the target BWP. Optionally, the adaptation is that K_offset_new=K_offset_old*ceil (TA2/TA1); or K_offset_new=K_offset_old*floor(TA2/TA1); where TA2 and TA1 need to convert to the same unit based on the same reference subcarrier spacing, or TA2 and TA1 are converted to absolute time in micro-second or millisecond; and 'ceil' is the round-up operation, e.g. ceil (2.3)=3; and 'floor' is the round-down operation, e.g. floor (2.6)=2.

Example 3: UE Level Configuration

The base station may configure the K_offset value via UE-specific MAC-CE or UE-specific DCI. Alternatively the base station may indicate the K_offset to a group of UEs via group-common MAC-CE or group-common DCI. The group-common DCI is transmitted in group-common PDCCH and scrambled with a RNTI known to the group of UEs. Optionally, the base station may configure the K_offset value in random access response (RAR).

Example 4: Joint Indication

While examples 1-3 illustrate the cases where the full K_offset value is indicated either by a cell level indication, or a beam level indication or a UE level indication, in this example, we describe a joint indication by a combination of the examples 1 to 3. Assume that a K_offset may be decomposed to K_offset=K_offset1+K_offset2, where K_offset1 may be a common value which is related to a reference RTT to a reference point and K_offset2 is an offset correction value which may be positive or negative or zero. The interpretation of K_offset2 is how close between the reference offset (K_offset1) and the true offset (K_offset). The advantage is that if K_offset1 is not changed very often, the base station will only update the K_offset2 for the K_offset adjustment, thus the signaling overhead can be greatly reduced.

One possible combination of time offset indications is thus to configure K_offset=K_offset1+K_offset2, where K_offset1 is configured by cell level indication (e.g. SIB1, or SIBx) and the offset correction K_offset2 is configured for each beam by beam level indication (e.g. BWP configuration)

Other combinations are also possible, such as:
K_offset=K_offset1+K_offset2, where K_offset1 is configured by a beam level (or footprint level) indication, K_offset2 is configured by UE level indication;
K_offset=K_offset1+K_offset2, where K_offset1 is configured by a cell level indication, K_offset2 is configured by UE level indication;
K_offset=K_offset1+K_offset2+K_offset3, where K_offset1 is configured by a cell level indication, K_offset2 is configured by UE level indication, K_offset3 is configured by a beam level (or footprint level) indication.

Figure 2A:
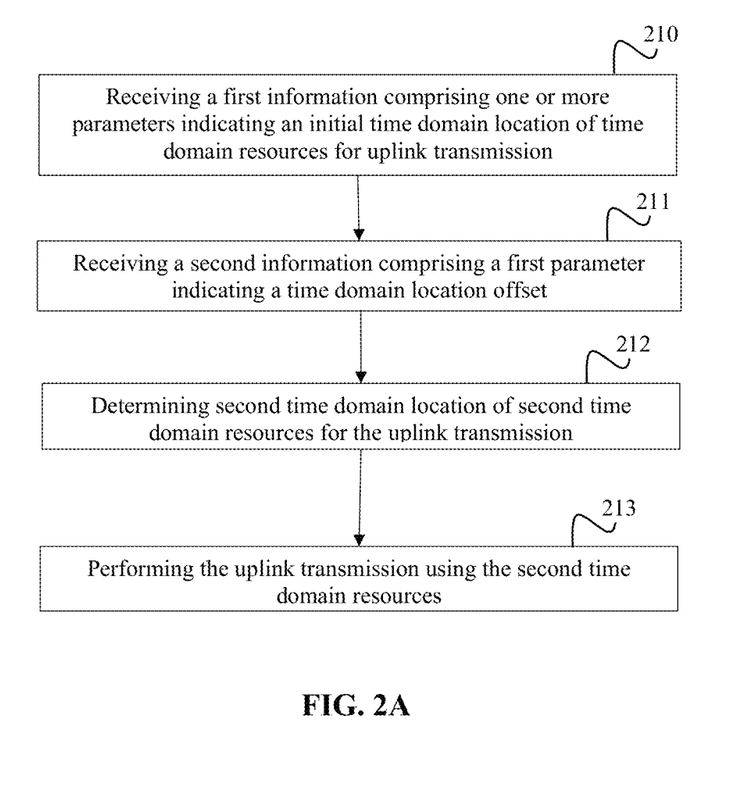
FIG. 2A is a flowchart of an example implementation of a method performed by a user equipment for uplink transmission scheduling.

FIG. 2A is a flowchart of an example method for performing an uplink transmission.

The steps of the method may be implemented by a device in a user equipment according to any example described herein. The user equipment is served by a base station in a non-terrestrial network.

While the steps are described in a sequential manner, the man skilled in the art will appreciate that some steps may be omitted, combined, performed in different order and/or in parallel.

In step 210, a first information comprising one or more parameters indicating an initial time domain location of initial time domain resources allocated for the uplink transmission is received from a base station.

In step 211, a second information comprising a first parameter indicating at least one time domain location offset indication is received from a base station. The at least one time domain location offset indication is to shift by one or more offset values the initial time domain location of the initial time domain resources allocated for the uplink transmission.

The at least one time domain location offset indication may include a time domain location offset indication at a cell level and/or a time domain location offset indication to one or more user equipments and/or a time offset indication to one or more beams.

In step 212, second time domain location of second time domain resources for the uplink transmission are determined such that the second time domain resources are delayed compared to the initial time domain resources based on the one or more time domain location offset values.

In step 213, the uplink transmission is performed using the second time domain resources determined in step 212. For example, the uplink transmission will start with the first symbol of the second time domain resources.

Figure 2B:
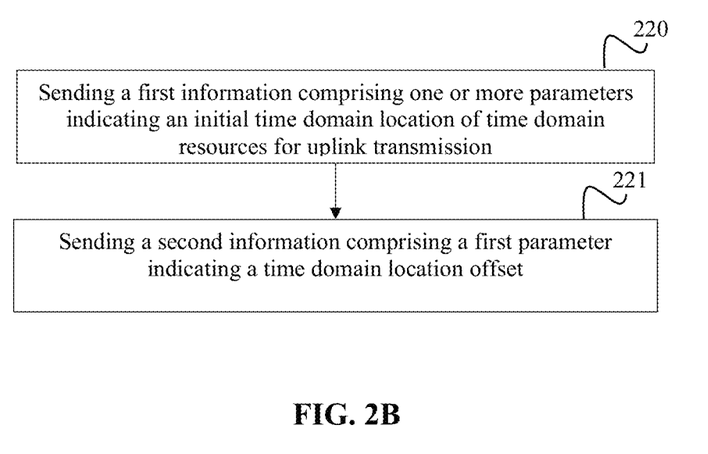
FIG. 2B is a flowchart of an example implementation of a method for performed by a base station for uplink transmission scheduling.

FIG. 2B is a flowchart of an example method for scheduling by a base station uplink transmission.

The steps of the method may be implemented by a device in a base station according to any example described herein. The base station may serve one or more user equipment in a non-terrestrial network.

While the steps are described in a sequential manner, the man skilled in the art will appreciate that some steps may be omitted, combined, performed in different order and/or in parallel.

In step 220, a first information comprising one or more parameters indicating an initial time domain location of initial time domain resources allocated for uplink transmission is sent to one or more user equipments.

In step 221, a second information comprising a first parameter indicating at least one time domain location offset indication is sent to one or more user equipments. The at least one time domain location offset indication is to shift by one or more offset values the initial time domain location of the initial time domain resources allocated for the uplink transmission. The at least one time offset indication is to determine second time domain resources for the uplink transmission such that the second time domain resources are delayed compared to the initial time domain resources based on the one or more time offset values corresponding to the at least one time offset indication.

Further examples will now be described by reference to FIGS. 3A to 3E.

Example 5: the UE Applies K_offset for PUCCH Transmission

When a base station schedules a PDSCH transmission by DCI format 1_0 or DCI format 1_1, an indication field PDSCH-to-HARQ_feedback timing (K1) in the DCI format 1_0/1_1 indicates an initial slot location for PUCCH transmission, which carriers the acknowledgement of the PDSCH reception.

Figure 3A:
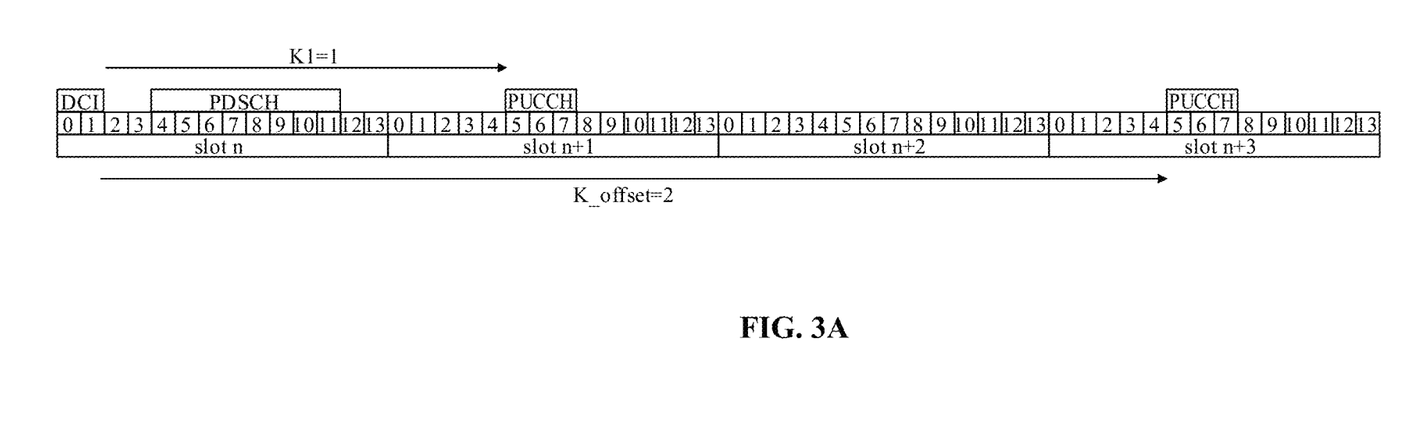
FIG. 3A to 3E show examples for adjusting time offset values and allocated time domain resources.

When the UE obtains K_offset and if the K_offset is amount of slots, the UE will determine that the actual (delayed) PUCCH time domain resources is in K1+K_offset slot(s) after the slot that the UE receives the scheduled PDSCH. Or equivalently said in K_offset slots after the initial slot for PUCCH. As shown in FIG. 3A, the UE receives DCI in slot n, the DCI indicates K1=1, which corresponds to allocated PUCCH time domain resource in slot n+1. Assume K_offset=2, then the UE will determine that the actual PUCCH time domain resources is in slot n+3. The symbol position of PUCCH relative to the slot is not changed compared to the initial position in slot n+1 of the initially allocated PUCCH time domain resources. Optionally, in some TDD cases, the determined (delayed) PUCCH resources are on the downlink symbols, in this case the UE can further increase the K_offset by 1, i.e. K_offset=K_offset+1, which is equivalent to further shift/delay one slot. The UE will keep increasing the K_offset until all the PUCCH resources are on non-downlink symbols. The symbol format in a slot can be configured by tdd-UL-DL-ConfigurationCommon and/or tdd-UL-DLConfigurationDedicated and/or slot format indicator (SFI)-index in DCI format 2_0. As shown in the example, if the determined slot n+3 is a full downlink slot, the UE will further shift to the next earliest uplink slot or the next earliest non-full downlink slot where the PUCCH symbol positions 5-7 are non-downlink symbols, i.e. either uplink symbols or flexible symbols.

Figure 3B:
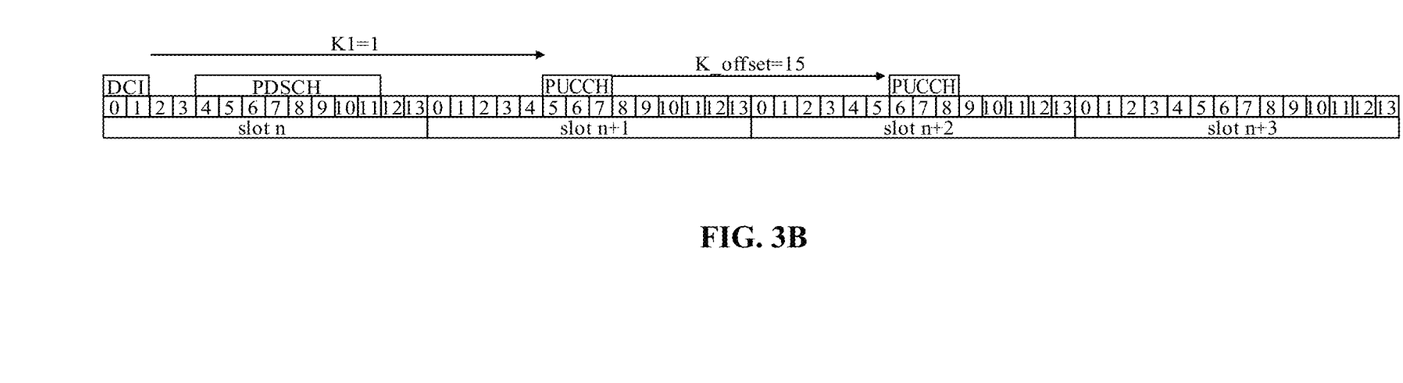
Figure 3C:
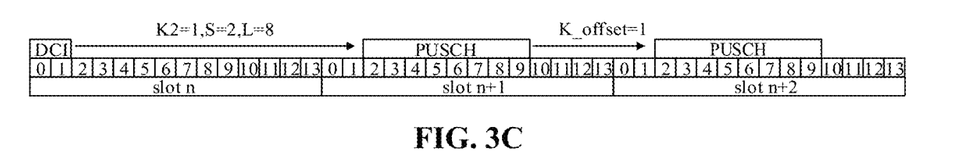
Figure 3D:
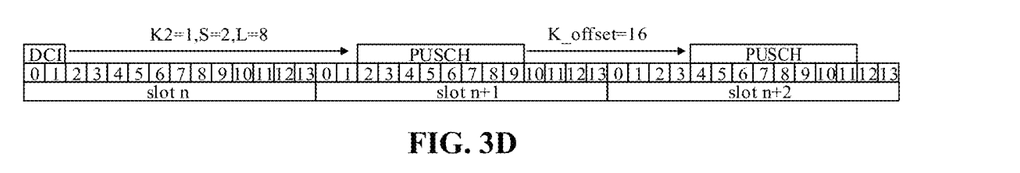
Figure 3E:
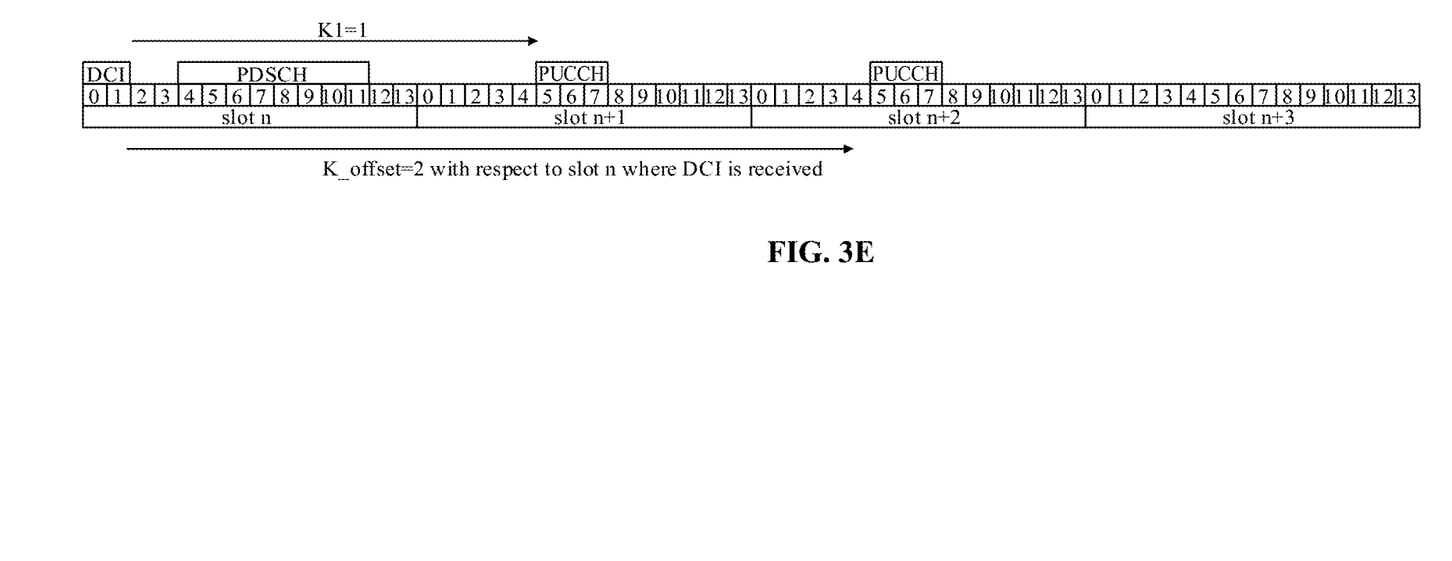

In another example, where K_offset is amount of symbols, the initial slot location of PUCCH is given by the indication field PDSCH-to-HARQ_feedback timing (K1) in the DCI format 1_0/1_1 and the initial symbol location for PUCCH is given by the PUCCH resource indicator field in the DCI format 1_0/1_1 together with PUCCH-resource configuration in RRC or pre-defined PUCCH resource. Then actual PUCCH symbol location is corresponding to the K_offset and the initial symbol location of PUCC. One example is that K_offset is applied relative to the starting symbol position. As shown in FIG. 3B, if the initial starting symbol location of PUCCH is in slot n+1 and position 5, thus, the actual starting symbol location of PUCCH is K_offset symbols after the initial starting symbol location of PUCCH, i.e. symbol position 6 in slot n+2. Alternatively (not represented), the K_offset can be applied to the last symbol location of the PUCCH to determine the actual starting symbol location of the PUCCH. Since the starting symbol or last symbol location can be determined from one to the other by considering the total PUCCH length (in terms of the number of symbols), either starting symbol location or last symbol location can be used as the reference location for K_offset application. Similar for actual symbol location of PUCCH, either starting symbol location or last symbol location can be referred to. Therefore, we will not enumerate extensive examples for explanation.

Optionally, in some TDD cases, the determined (delayed) PUCCH resources are on the downlink symbols, in this case the UE can further increase the K_offset by 1, i.e. K_offset=K_offset+1, which is equivalent to further shift/delay one symbol. The UE will keep increasing the K_offset until all the PUCCH resources are on non-downlink symbols. The symbol format in a slot can be configured by tdd-UL-DL-ConfigurationCommon and/or tdd-UL-DLConfigurationDedicated and/or slot format indicator (SFI)-index in DCI format 2_0.

The example 5 is likewise applicable to other types of uplink transmission like PUSCH or SRS transmission.

Example 6: UE Applies K_Offset for PUSCH Transmission

For dynamic scheduled PUSCH transmissions, an PUSCH transmission can be scheduled by DCI format 0_0 or format 0_1, or scheduled by random access response (RAR). For DCI format 0_0/0_1 scheduled PUSCH transmission, the base station indicates the initial slot location of PUSCH with Time-domain resource assignment field, which further comprises parameters K2, S, L indicating the slot location, starting symbol location and PUSCH duration (in terms of number of symbols), respectively. While for RAR scheduled PUSCH transmission, the base station indicates the initial slot location of PUSCH with PUSCH time domain resource allocation field, which further comprises parameters K2, S, L indicating the slot location, starting symbol location and PUSCH duration (in terms of number of symbols), respectively. Then the actual PUSCH time domain location corresponds to the K_offset and the initial time domain location of PUSCH. The K_offset application is similar to example 5, thus it is not repeated in this example.

Example 7: K_offset Adjustment

As presented in example 3 and 4, the K_offset can be split into sub-portions, which means that the K_offset is an aggregated offset value which is accumulated from multiple K_offset sub-portions. In another example, due to mobility of the base station (e.g. satellite), the distance between the base station and the UE is time varying. The faster the base station mobility, the shorter time duration the distance keeps stationary. This leads to a time varying round trip time, yielding further a time varying K_offset. To address this issue, naturally, the K_offset should be adjusted during the time, the adjustment can be controlled by the base station, e.g. sending K_offset adjustment with MAC-CE, or RRC or DCI or RAR or system information or MAC PDU that is transmitted in PDSCH with UE contention resolution identity. This solution is similar to example 3 or 4. The K_offset adjustment is seen as one K_offset sub-portion, except for that as an adjustment, the K_offset portion takes either positive sign or negative sign. This means that the K_offset will be updated by K_offset+K_offset adjustment where the K_offset adjustment can have positive or negative values. We call this solution as close-loop adjustment. The close-loop solution is simple but the signaling overhead might be overwhelmed if the need for K_offset adjustment is quite often, e.g. due to extremely high satellite velocity (LEO case). To this sense, an alternative solution is that the UE can predict the K_offset adjustment based on some satellite ephemeris date, e.g. velocity, moving direction/angle, distance, etc. Since these ephemeris information are relatively stationary and do not vary too much during the time, the signaling overhead is small and the UE can take advantage of these information to predict the RTT change, which further links to the K_offset adjustment. One example is that there is a pre-defined relation between the K_offset adjustment quantity and one or more parameters. The one or more parameters are provided by the base station and the relation is function of time that takes the one or more parameters into account and the output of the function is the K_offset adjustment. We call this solution as open-loop adjustment. Optionally, the base station can decide to use a combination of close-loop and open-loop adjustment, e.g. signaling the K_offset adjustment over a larger step of time, and UE predicts the K_offset adjustment during the time where no K_offset adjustment signaled by the base station. This solution gives a good tradeoff between the signaling overhead and adjustment accuracy.

In some other examples, the K_offset can be directly updated by receiving a new K_offset value from the base station with MAC-CE, or RRC, or DCI, or RAR or system information. Once the new K_offset is received, the UE will ignore the old K_offset value and apply the new K_offset value. Another example is that when the initial timing advance is estimated by UE itself and the UE will transmit the RACH preamble to the base station based on the estimated TA. Then the base station will assign a K_offset value to the UE in RAR. After that, the UE can report the estimated TA to the base station in message 3 (Msg3). The resource allocated of PUSCH for reporting Msg3 is given by RAR. Once the UE reported the estimated TA in Msg3, the base station can adjust the K_offset for this UE. The K_offset adjustment is transmitted in the MAC PDU that is carried by PDSCH with UE contention resolution identity. Optionally, the K_offset adjustment is transmitted in the DCI that schedules the PDSCH with UE contention resolution identity. Note that the base station can alternatively transmit a new K_offset for this UE instead of a K_offset adjustment as we have discussed in above examples. It should be appreciated by the man skilled in the art that any functions, engines, block diagrams, flow diagrams, state transition diagrams and/or flowcharts herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processing apparatus, whether or not such computer or processor is explicitly shown.

Each described function, engine, block, step may be implemented in hardware, software, firmware, middleware, microcode, or any suitable combination thereof. If implemented in software, the functions, engines, blocks of the block diagrams and/or flowchart illustrations may be implemented by computer program instructions/software code, which may be stored or transmitted over a computer-readable medium, or loaded onto a general purpose computer, special purpose computer or other programmable processing apparatus and/or system to produce a machine, such that the computer program instructions or software code which execute on the computer or other programmable processing apparatus, create the means for implementing the functions described herein.

Implementations of the various techniques and methods described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium.

In the present document, the wording "means configured to perform . . . " a function shall be understood as functional block(s) comprising circuitry that is adapted for performing or configured to perform the function. Moreover, any entity described herein as "means", may correspond to or be implemented as "one or more modules", "one or more devices", "one or more units", etc. Means for performing one or more functions may for example comprises at least processor and at least one memory (e.g. in a system or apparatus) for storing computer program code configured to, with the at least one processor, cause the performance (by a system or corresponding device) of the one or more functions.

When provided by a processor, the functions may be provided by a single dedicated processor, by a single shared processor, or by a plurality of individual processors, some of which may be shared. The functions of the various elements shown in the figures, including any functional blocks labeled as "processors", may be provided through the use of dedicated hardware as well as hardware capable of executing software in association with appropriate software.

Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

The term "circuitry" may refer to hardware-only circuit implementations; combinations of circuits and software and/or firmware; or hardware circuit(s) and/or processor(s), such as a microprocessors or a portion of a microprocessor(s), that require or not software and/or firmware for operation, whether the software or firmware is or not physically present. A circuitry may be a general purpose circuitry or a special purpose logic circuitry, e.g., an FPGA (field programmable gate array) or an ASIC (application-specific integrated circuit). The term circuitry also covers, for example and if applicable to the particular claimed element, a baseband integrated circuit, processor integrated circuit or a similar integrated circuit for a base station and/or user equipment.

Some embodiments are also intended to cover computer-readable medium, e.g., digital data storage media, which are machine or computer readable and encode machine-executable or computer-executable programs of instructions, wherein such instructions are configured to cause the execution of some or all of the steps of said above-described methods by a corresponding apparatus, device or system. The computer-readable medium may be, e.g., digital memories, magnetic storage media such as a magnetic disks and magnetic tapes, hard drives, or optically readable digital data storage media.

Embodiments of a computer-readable medium includes, but are not limited to, both computer storage media and communication media including any medium that facilitates transfer of a computer program from one place to another. Specifically, program instructions or computer readable program code to perform embodiments described herein may be stored, temporarily or permanently, in whole or in part, on a non-transitory computer readable medium of a local or remote storage device including one or more storage media.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

A computer program, such as the computer program(s) described above, may be written in any form of programming language, including compiled or interpreted languages, and may be deployed in any form, including as a stand-alone program or as a module, component, subroutine, or other unit or part of it suitable for use in a computing environment. A computer program may be deployed to be executed on one computer or on multiple computers at one site or distributed across multiple sites and interconnected by a communication network.

Figure 4:
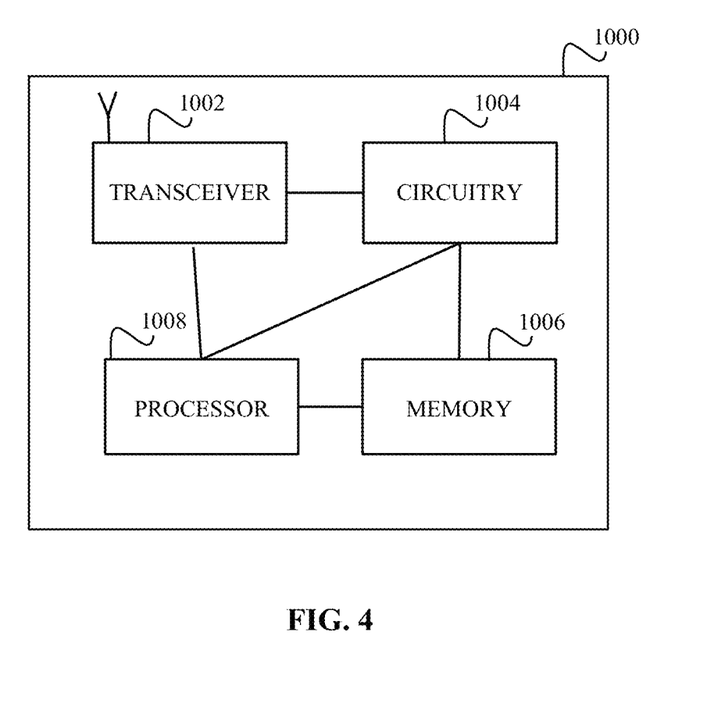
FIG. 4 is a block diagram of a device according to an example implementation.

For completeness, FIG. 4 shows an example block diagram of a device (e.g. a device in a user equipment or base station) 1000 according to an implementation. The device 1000 may include, for example, one or more radio transceivers 1002, where each radio transceiver includes a transmitter to transmit radio signals and a receiver to receive radio signals. The device 1000 also includes a circuitry 1004 (e.g. a processor, control unit/entity, controller) to execute instructions or software and control transmission and receptions of signals, and a memory 1006 to store data and/or instructions. The circuitry 1004 may control the radio transceiver 1002 to receive, send, broadcast or transmit signals and/or data. When the circuitry 1004 is implemented in a user equipment, it may be configured to process DFI signal and perform any of the processing steps described herein.

The circuitry 1004 may also make decisions or determinations, generate frames, packets or messages for transmission, decode received frames or messages for further processing, and other tasks or functions described herein. The circuitry 1004, which may be a baseband processor, for example, may generate messages, packets, frames or any other signals for transmission via radio transceiver 1002. The circuitry 1004 may control transmission of signals or messages over a radio network, and may control the reception of signals or messages, etc., via a radio network (e.g., after being down-converted by radio transceiver 1002, for example). The circuitry 1004 may be programmable and capable of executing software or other instructions stored in memory or on other computer media to perform the various tasks and functions described above, such as one or more of the tasks or methods described above. The circuitry 1004 may be or include, for example, hardware, programmable logic, a programmable processor that executes software or firmware, and/or any combination of these. Using other terminology, the circuitry 1004 and transceiver 1002 together may be considered as a radio transmitter/receiver system, for example.

In addition, a processor 1008 may execute software and instructions, may provide overall control for the device 1000, and may provide control for other systems not shown in FIG. 4 such as controlling input/output devices and/or may execute software for one or more applications that may be provided on device 1000.

In addition, a computer-readable storage medium may be provided that includes stored instructions, which when executed by the processor 1008 performs one or more of the functions, steps or tasks described above for the concerned device.

For example, the device 1000 also may include, or be operatively coupled to receive data from or transfer data to, or both, one or more computer-readable storage mediums, e.g., magnetic, magneto-optical disks, or optical disks. A computer-readable storage medium suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

The processor 1008 may be configured to access to one or more memories for storing instructions and data and to execute instructions. The processor 1008 may be configured to store, read, load and/or otherwise process computer program code stored in a computer-readable storage medium and/or in the memory 1006 that, when executed by the at least one processor, causes the device 1000 to perform one or more steps of a method described herein for the concerned device 1000. Processors suitable for the execution of a computer program include, by way of example, both general and special purpose microprocessors, and any one or more processors of any kind of digital computer, chip or chipset. Generally, a processor will receive instructions and data from a read-only memory or a random access memory or both.

The processor 1008 may be any suitable processor, e.g. a microprocessor, microcontroller, integrated circuit, or central processing unit (CPU) including at least one hardware-based processor or processing core.

The memory 1006 may include a random access memory (RAM), cache memory, non-volatile memory, backup memory (e.g., programmable or flash memories), read-only memory (ROM), a hard disk drive (HDD), a solid state drive (SSD) or any combination thereof. The ROM of the memory 1006 may be configured to store, amongst other things, an operating system of the device 1000 and/or one or more computer program codes of one or more computer programs. The RAM of the memory 1006 may be used by the processor 1008 for the temporary storage of data.

The description and drawings merely illustrate the principles of the invention. It will thus be appreciated that those skilled in the art will be able to devise various arrangements that, although not explicitly described or shown herein, embody the principles of the invention and are included within its spirit and scope.

Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method for performing an uplink transmission by a user equipment (UE) in a non-terrestrial network, the method comprising
   receiving, from a base station, a first information for indicating uplink transmission resources, wherein the first information comprises one or more parameters indicating an initial time domain location of initial time domain resources allocated for the uplink transmission;
   receiving, from the base station, a second information, wherein the second information comprises a first parameter for indicating the uplink transmission resources, the first parameter indicates at least one time domain location offset indication, wherein the at least one time domain location offset indication is to shift by one or more offset values the initial time domain location of the initial time domain resources allocated for the uplink transmission; and
   performing, based on the first information and the second information, an uplink transmission on the uplink transmission resources.

2. The method according to claim 1, wherein the second information comprises system information, and the system information comprises first system information block (SIB1), and the SIB 1 comprises the first parameter.

3. The method according to claim 1, wherein the second information comprises random access response (RAR), and the RAR comprises the first parameter.

4. The method according to claim 1, wherein the second information comprises a medium access control protocol data unit (MAC PDU), that is transmitted in Physical Downlink Shared Channel (PDSCH) with UE contention resolution identity, and the MAC PDU comprises the first parameter.

5. The method according to claim 1, wherein the second information comprises a first radio resource control (RRC).

6. The method according to claim 5, wherein the first RRC comprises bandwidth part (BWP) configuration, and the BWP configuration comprises the first parameter.

7. The method according to claim 6, wherein the BWP configuration comprises BWP-Uplink information element.

8. The method according to claim 5, wherein the first RRC comprises a first configuration for the uplink transmission, and the first configuration comprises the first parameter.

9. The method according to claim 8, wherein the first configuration comprises physical uplink shared channel (PUSCH) configuration.

10. The method according to claim 8, wherein the first configuration comprises physical uplink control channel (PUCCH) configuration.

11. The method according to claim 8, wherein the first configuration comprises sounding reference signal (SRS) configuration.

12. The method according to claim 5, wherein the first RRC comprises a second configuration, and the second configuration corresponds to a first beam identifier, and the second configuration comprises the first parameter.

13. The method according to claim 12, wherein the first beam identifier corresponds to synchronization signal block (SSB) index and/or footprint identifier.

14. The method according to claim 1, wherein the second information comprises a first downlink control indicator (DCI), and the first DCI comprises the first parameter, wherein the first DCI is of a first DCI format.

15. The method according to claim 14, wherein the first information comprises a second DCI, the second DCI is used for indicating the uplink transmission resources, wherein the second DCI is of a second DCI format, and the second DCI format is different from the first DCI format.

16. A method for scheduling uplink transmission in a non-terrestrial network, the method comprising
    sending, by a base station to one or more user equipments, a first information for indicating uplink transmission resources, wherein the first information comprises one or more parameters indicating an initial time domain location of initial time domain resources allocated for the uplink transmission; and
    sending, by the base station to one or more user equipments, a second information, wherein the second information comprises a first parameter for indicating the uplink transmission resources, the first parameter indicates at least one time domain location offset indication, wherein the at least one time domain location offset indication is to shift by one or more offset values the initial time domain location of the initial time domain resources allocated for the uplink transmission.

17. A user equipment, comprising:
    a processor;
    a transceiver; and
    a memory configured to store instructions,
    wherein the processor is configured to execute the instructions to:
    control the transceiver to receive, from a base station, a first information for indicating uplink transmission resources, wherein the first information comprises one or more parameters indicating an initial time domain location of initial time domain resources allocated for the uplink transmission, and receive, from the base station, a second information, wherein the second information comprises a first parameter for indicating the uplink transmission resources, the first parameter indicates at least one time domain location offset indication, wherein the at least one time domain location offset indication is to shift by one or more offset values the initial time domain location of the initial time domain resources allocated for the uplink transmission; and
    perform, based on the first information and the second information, an uplink transmission on the uplink transmission resources.

18. A base station, comprising:
    a processor;
    a transceiver; and
    a memory configured to store instructions, wherein the processor is configured to execute the instructions to:

control the transceiver to send, to one or more user equipments, a first information for indicating uplink transmission resources, wherein the first information comprises one or more parameters indicating an initial time domain location of initial time domain resources allocated for the uplink transmission;

control the transceiver to send, to one or more user equipments, a second information, wherein the second information comprises a first parameter for indicating the uplink transmission resources, the first parameter indicates at least one time domain location offset indication, wherein the at least one time domain location offset indication is to shift by one or more offset values the initial time domain location of the initial time domain resources allocated for the uplink transmission.

* * * * *